US008943823B2

(12) United States Patent
Fiveland

(10) Patent No.: US 8,943,823 B2
(45) Date of Patent: Feb. 3, 2015

(54) FLUID HANDLING SYSTEM HAVING DEDICATED EGR TURBO-GENERATOR

(75) Inventor: Scott B. Fiveland, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 538 days.

(21) Appl. No.: 12/949,629

(22) Filed: Nov. 18, 2010

(65) Prior Publication Data

US 2012/0124992 A1    May 24, 2012

(51) Int. Cl.
| | |
|---|---|
| F02B 33/44 | (2006.01) |
| F02D 29/06 | (2006.01) |
| F02M 25/07 | (2006.01) |
| F01N 5/02 | (2006.01) |
| F02B 37/00 | (2006.01) |
| F02B 37/18 | (2006.01) |
| F02M 31/04 | (2006.01) |
| F02M 31/08 | (2006.01) |
| F02B 29/04 | (2006.01) |

(52) U.S. Cl.
CPC ............... *F02D 29/06* (2013.01); *F02M 25/07* (2013.01); *F01N 5/02* (2013.01); *F02B 37/004* (2013.01); *F02B 37/18* (2013.01); *F02M 25/0711* (2013.01); *F02M 25/073* (2013.01); *F02M 31/042* (2013.01); *F02M 31/08* (2013.01); *F02B 29/0425* (2013.01); *F02B 29/0437* (2013.01); *Y02T 10/121* (2013.01); *Y02T 10/144* (2013.01); *Y02T 10/126* (2013.01); *Y02T 10/16* (2013.01)
USPC ........ 60/605.2; 60/612; 123/562; 123/568.12

(58) Field of Classification Search
CPC .... F02G 5/02; F02M 25/073; F02M 25/0707; F02M 25/07; F02B 29/06; F02B 29/0406; Y02T 10/16

USPC ................. 60/605.2, 611, 599, 612; 123/562, 123/568.12
See application file for complete search history.

(56) References Cited

U.S. PATENT DOCUMENTS

| | | | | |
|---|---|---|---|---|
| 3,673,797 | A * | 7/1972 | Wilkinson | ...................... 60/600 |
| 5,105,624 | A * | 4/1992 | Kawamura | ...................... 60/608 |
| 5,881,559 | A * | 3/1999 | Kawamura | ...................... 60/597 |
| 6,038,860 | A * | 3/2000 | Bailey | .......................... 60/605.2 |
| 6,062,026 | A | 5/2000 | Woollenweber et al. | |
| 6,216,458 | B1 * | 4/2001 | Alger et al. | .................. 60/605.2 |
| 6,324,846 | B1 * | 12/2001 | Clarke | .......................... 60/605.2 |
| 6,360,732 | B1 * | 3/2002 | Bailey et al. | ............. 123/568.12 |
| 6,922,995 | B2 * | 8/2005 | Kawamura et al. | ............. 60/608 |
| 6,938,420 | B2 * | 9/2005 | Kawamura et al. | ............. 60/612 |

(Continued)

FOREIGN PATENT DOCUMENTS

| | | |
|---|---|---|
| DE | 10331187 | 2/2005 |
| DE | 102008027883 | 12/2009 |

(Continued)

*Primary Examiner* — Thai Ba Trieu
*Assistant Examiner* — Jason T Newton
(74) *Attorney, Agent, or Firm* — Finnegan, Henderson, Farabow, Garrett & Dunner LLP

(57) ABSTRACT

A fluid handling system for a use with an engine is provided. The fluid-handling system may have a first turbine connected to receive a portion of an exhaust flow from the engine, a first compressor driven by the first turbine to pressurize an airflow, and a heat exchanger configured to receive a remaining portion of the exhaust flow from the engine and the airflow from the first compressor. The fluid-handling system may also have a second turbine connected to receive the airflow from the heat exchanger, and a generator driven by the second turbine to generate power.

19 Claims, 2 Drawing Sheets

(56) References Cited

U.S. PATENT DOCUMENTS

| | | |
|---|---|---|
| 7,047,743 B1 * | 5/2006 | Stahlhut et al. ............... 60/608 |
| 7,076,954 B1 * | 7/2006 | Sopko et al. ................. 60/607 |
| 7,165,403 B2 * | 1/2007 | Sun et al. .................... 60/612 |
| 8,522,757 B2 * | 9/2013 | Vuk ........................ 123/568.12 |
| 8,627,662 B2 * | 1/2014 | Freund et al. ............... 60/606 |
| 2001/0045090 A1 | 11/2001 | Gray, Jr. |
| 2007/0220885 A1 * | 9/2007 | Turner et al. ............... 60/605.2 |
| 2009/0218815 A1 * | 9/2009 | Stahlhut et al. ............... 290/7 |
| 2009/0277430 A1 * | 11/2009 | Ernst et al. ............... 123/568.12 |
| 2010/0095941 A1 | 4/2010 | Auffret et al. |
| 2010/0146965 A1 * | 6/2010 | Easley et al. ............... 60/602 |
| 2011/0088671 A1 * | 4/2011 | Johnson ................. 123/568.12 |
| 2011/0296833 A1 * | 12/2011 | Mardberg Jozsa et al. .. 60/605.2 |
| 2013/0098030 A1 * | 4/2013 | Freund et al. ............... 60/599 |

FOREIGN PATENT DOCUMENTS

| | | | |
|---|---|---|---|
| JP | 64-000345 | 1/1989 | |
| JP | 2001-073884 | 3/2001 | |
| JP | 2001-132442 | 5/2001 | |
| JP | 2004-011562 | 1/2004 | |
| WO | WO 2009/050534 | 4/2009 | |
| WO | WO 2010035054 A1 * | 4/2010 | ............. F02B 37/00 |

\* cited by examiner

FLUID HANDLING SYSTEM HAVING DEDICATED EGR TURBO-GENERATOR

TECHNICAL FIELD

The present disclosure is directed to a fluid-handling system and, more particularly, to a fluid-handling system having a dedicated exhaust gas recirculation (EGR) turbo-generator.

BACKGROUND

Internal combustion engines such as diesel engines, gasoline engines, and gaseous fuel-powered engines exhaust a complex mixture of air pollutants as byproducts of the combustion process. These air pollutants are composed of gaseous compounds including, among other things, the oxides of nitrogen (NOx). Due to increased attention on the environment, exhaust emission standards have become more stringent and the amount of NOx emitted to the atmosphere from an engine can be regulated depending on the type of engine, size of engine, and/or class of engine.

One method that has been utilized by engine manufacturers to comply with the regulation of engine emissions has been to implement exhaust gas regeneration (EGR). EGR systems recirculate exhaust gas to mix with combustion air supplied to an engine. The recirculated exhaust gas reduces a concentration of oxygen and increases a thermal mass within the engine's cylinders, thereby lowering a resulting combustion temperature. The lowered combustion temperature slows the chemical reaction of the combustion process and decreases the formation of NOx.

Although successful at reducing NOx, the effectiveness of an EGR system can be influenced by an amount of heat contained within the exhaust gas that is recirculated. That is, the exhaust gas that is recirculated back into the engine can contain large amounts of energy in the form of waste heat, which can increase the in-cylinder combustion temperature and counteract the desired NOx reduction. In addition, the excess heat also taxes the engine's cooling system and may represent an unutilized source of energy that, if harnessed, could increase engine efficiency.

An exemplary system implementing EGR is disclosed in U.S. Pat. No. 6,216,458 of Alger et al. that issued on Apr. 17, 2001 ("the '458 patent"). Specifically, the '458 patent discloses an exhaust gas recirculating (EGR) system for a turbocharged internal combustion engine. The EGR system includes a recirculation conduit for recirculating a volume of exhaust gas from the exhaust manifold to the intake manifold, a cooling air conduit for transporting a flow of cooling air, and a gas-to-air heat exchanger disposed in operative association with the recirculation conduit and the cooling air conduit. The heat exchanger is adapted for cooling the volume of the recirculated exhaust gas in the recirculation conduit.

SUMMARY

In one aspect, the disclosure is directed toward a fluid-handling system for an engine. The fluid-handling system may include a first turbine connected to receive a portion of an exhaust flow from the engine, a first compressor driven by the first turbine to pressurize an airflow, and a heat exchanger configured to receive a remaining portion of the exhaust flow from the engine and the airflow from the first compressor. The fluid-handling system may also include a second turbine connected to receive the airflow from the heat exchanger, and a generator driven by the second turbine to generate power.

In another aspect, the disclosure is directed toward a method of handling exhaust from an engine. The method may include combusting a mixture of air and fuel to generate a mechanical output and an exhaust flow, mechanically removing energy from a portion of the exhaust flow, and using the energy to pressurize an airflow. The method may further include transferring heat from the exhaust flow to the airflow, mechanically removing energy from the airflow after transferring the heat, and converting the energy mechanically removed from the airflow to one of electrical energy, hydraulic energy, and kinetic energy.

DETAILED DESCRIPTION

Figure 1:
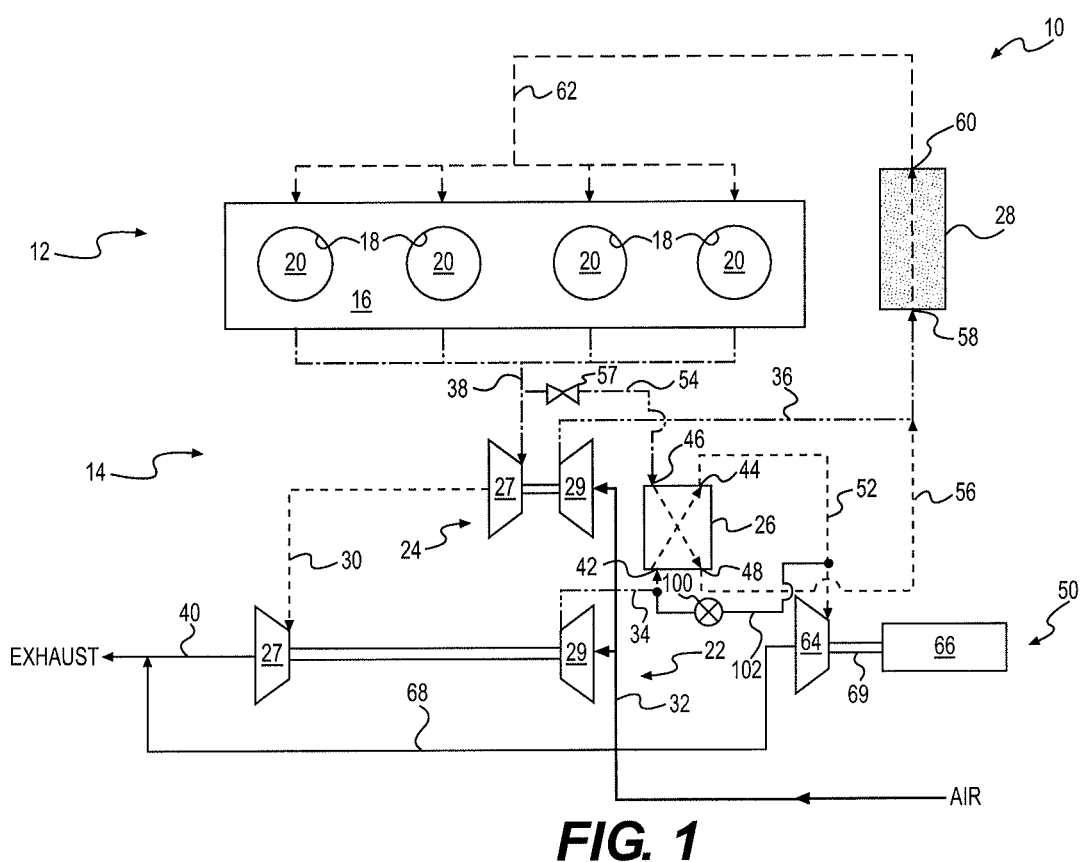
FIG. 1 is a schematic illustration of an exemplary disclosed power system.

FIG. 1 illustrates a power system 10 having a power source 12 and a fluid handling system 14. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 16 that at least partially defines a plurality of cylinders 18. A piston (not shown) may be slidably disposed within each cylinder 18 to reciprocate between a top-dead-center position and a bottom-dead-center position, and one or more cylinder heads (not shown) may be connected to engine block 16 to close off an end of each cylinder 18. Each cylinder 18, piston, and cylinder head may together define a combustion chamber 20. In the illustrated embodiment, power source 12 includes four such combustion chambers 20. However, it is contemplated that power source 12 may include a greater or lesser number of combustion chambers 20 and that combustion chambers 20 may be disposed in an "in-line" configuration, a "V" configuration, or in any other suitable configuration.

Fluid handling system 14 may include components that interact to introduce charged air into power source 12 for combustion purposes and direct a resulting exhaust flow from power source 12 to the atmosphere. For example, fluid handling system 14 may include an exhaust gas recirculation (EGR) turbocharger 22, a combustion turbocharger 24, an EGR cooler 26, and an air cooler 28. Each of turbochargers 22, 24 may embody a fixed geometry turbocharger, a variable geometry turbocharger, or any other type of turbocharger known in the art. Turbochargers 22, 24 may each include at least one turbine 27 configured to receive a flow of heated gases that expands within turbine 27 and thereby causes turbine 27 to rotate, and at least one compressor 29 driven by the rotation of its paired turbine 27 to compress a flow of air. Turbines 27 may be disposed in series and connected to each other by way of an exhaust passage 30, while compressors 29 may be disposed in parallel and connected to receive air by way of a passage 32. Pressurized air from EGR turbocharger 22 may be directed into EGR cooler 26 via a compressor passage 34, while pressurized air from combustion turbocharger 24 may be directed into air cooler 28 via a compressor passage 36. Combustion turbocharger 24 may receive a portion of an exhaust flow from power source 12 via an exhaust duct 38, while EGR turbocharger 22 may discharge the exhaust to the atmosphere via an exhaust passage 40.

EGR cooler 26 may embody an air-to-air heat exchanger configured to facilitate a transfer of thermal energy from a flow of recirculated exhaust gas to air pressurized by EGR turbocharger 22. EGR cooler 26 may have an air inlet 42, an air outlet 44, an exhaust inlet 46, and an exhaust outlet 48. Air inlet 42 may fluidly communicate with EGR turbocharger 22 via compressor passage 34. Air outlet 44 may fluidly communicate with a turbo-generator 50 via an air passage 52. Exhaust inlet 46 may fluidly communicate with exhaust duct 38 via an EGR passage 54. Exhaust outlet 48 may fluidly communicate with compressor passage 36 via an EGR passage 56. As pressurized air from EGR turbocharger 22 enters EGR cooler 26 via air inlet 42, the air may flow through channels of EGR cooler 26 and absorb heat from walls of the channels before exiting EGR cooler 26 via air outlet 44. At this same time, a remaining portion of the exhaust flow from power source 12 (i.e., a portion of a total exhaust flow from power source 12 that does not pass through exhaust duct 38 to combustion turbocharger 24) may pass through exhaust inlet 46 into adjacent or cross channels of EGR cooler 26 and transfer heat to the walls of these channels before exiting EGR cooler 26 via exhaust outlet 48. In this manner, the exhaust flowing through EGR cooler 26 may be reduced in temperature, while the airflow passing through EGR cooler 26 may increase in temperature. An EGR valve 57, for example a butterfly or ball valve, may be disposed within EGR passage 54 and be selectively movable between open and closed positions to control a flow rate of exhaust passing through EGR cooler 26 and, subsequently, a temperature of both the air and exhaust flows exiting EGR cooler 26. It is contemplated that a check valve, for example a reed-type check valve (not shown) may be situated within EGR passages 54 and/or 56, if desired, to provide for a unidirectional flow of exhaust through EGR cooler 26.

It is contemplated that additional or alternative ways of controlling air and/or exhaust temperatures within EGR cooler 26 may be utilized, if desired. For example, in addition to or in place of EGR valve 57, a bypass valve 100 may be placed within a passage 102 that extends between compressor passage 34 and air passage 54 and selectively movable based on a temperature of air and/or exhaust passing through EGR cooler 26. Bypass valve 100 may be selectively movable between closed and open positions to adjust a flow rate of air through EGR cooler 26 and thereby an amount of heat transfer occurring therein. Further, it is contemplated that vane geometry of EGR turbocharger 22 may be selectively altered based on air and/or exhaust temperatures, if desired, such that the flow rate of air through EGR cooler 26 and thereby the heat transfer occurring therein may be varied.

Air cooler 28 may embody an air-to-air heat exchanger, a liquid-to-air heat exchanger, a hybrid heat exchanger, or another type of heat exchanger known in the art that is configured to facilitate a transfer of thermal energy from a flow of coolant (compressed refrigerant, water, glycol, air, blended air mixture, etc.) to air pressurized by combustion turbocharger 24. Air cooler 28 may have an air inlet 58 and an air outlet 60. Air inlet 58 may fluidly communicate with combustion turbocharger 24 via compressor passage 36. Air outlet 60 may fluidly communicate with power source 12 via an air duct 62. As a mixture of pressurized air from combustion turbocharger 24 and cooled exhaust from EGR cooler 26 enters air cooler 28 via air inlet 58, the mixture may flow through channels of air cooler 28 and transfer heat to walls of the channels before exiting air cooler 28 via air outlet 60. At this same time, coolant may be directed through adjacent or cross channels of air cooler 28 and absorb heat from the walls of these channels before exiting air cooler 28 via air outlet 60. In this manner, the air/exhaust mixture passing through air cooler 28 may be reduced in temperature.

Turbo-generator 50 may include components that convert heat energy to useful electrical energy, hydraulic energy, kinetic energy, or another form of energy. In an exemplary embodiment, turbo-generator 50 includes a turbine 64 mechanically connected to a generator 66 and fluidly connected to receive air from air passage 52. Turbine 64 may be configured to receive the compressed airflow from EGR cooler 26 after the airflow has absorbed heat and increased in temperature. As the heated airflow passes through turbine 64, the expanding air may push against blades of turbine 64 to generate a rotational output. This rotational output may be directed into generator 66 thereby driving generator 66 to produce a power output. This power output may be utilized to increase an efficiency or capacity of power source 12 by, for example, redirecting the power output back into power source 12 via a motor (not shown). In addition or alternatively, the power output may be utilized to lower a demand for power from power source 12 by supplying auxiliary loads with power normally supplied by power source 12. Other uses for this power output are also considered. The air exiting turbine 64 may be directed via a passage 68 to join with the exhaust from EGR turbocharger 22 within passage 40 for discharge to the atmosphere.

Generator 66, in one embodiment, may be a three-phase permanent magnet alternating field-type generator configured to produce an alternating current (AC) output in response to a rotational input from turbine 64. It is also contemplated that generator 66 may alternatively be a switched reluctance generator, a direct phase generator, or any other appropriate type of generator known in the art. Generator 66 may include a rotor (not shown) rotatably connected to turbine 64 by any means known in the art such as, for example, by a direct shaft connection 69, via a gear train, through a hydraulic circuit, or in any other appropriate manner. Generator 66 may produce electrical power output as the rotor is rotated within a stator (not shown) by turbine 64. The output from generator 66 may be electrically connected with a common engine bus (not shown) via a generator inverter (not shown), which may invert the three-phase alternating power to direct phase power or, alternatively, directly to an AC motor or other AC auxiliary device, as desired. It is contemplated that the electrical power output from generator 66 may be stored for later use, if desired, for example by way of a battery or capacitor (not shown).

It is contemplated that generator 66 may embody another device configured to produce different forms of useful energy, if desired. For example, generator 66 could embody a kinetic generator such as a flywheel (not shown) that is configured to kinetically store and selectively release energy that facilitates operation of power source 12 or drives auxiliary loads. In another example, generator 66 could embody a hydraulic generator such as a pump that is driven to pressurize a hydraulic fluid or air that is used to drive power source 12 or auxiliary loads. It should be noted that other types of generators 66 can also be used.

Figure 2:
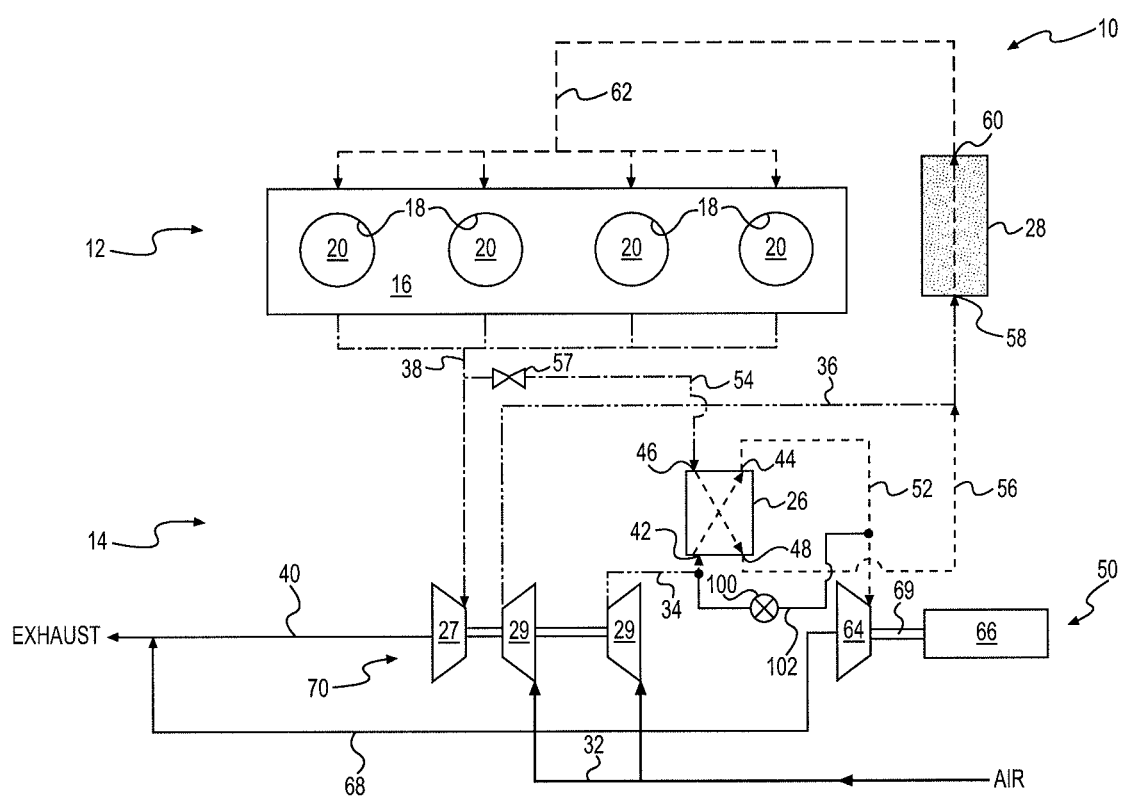
FIG. 2 is a schematic illustration of another exemplary disclosed power system.

FIG. 2 illustrates an alternative embodiment of fluid handling system 14. In this embodiment, the two separate EGR and combustion turbochargers 22, 24 have been replaced with a single turbocharger 70 having a single turbine 27 and two connected compressors 29. Turbine 27 may be propelled by the portion of the exhaust from power source 12 passing through exhaust duct 38 to drive both connected compressors 29. As in the embodiment of FIG. 1, both compressors 29 of turbocharger 70 of FIG. 2 may be connected to passage 32 to receive inlet air in parallel, but separately connected to compressor passages 34 and 36. The embodiment of FIG. 2 may realize some cost and space savings due to the reduced component count, as compared to the embodiment of FIG. 1, but may also have a lower power absorption capability, efficiency, and/or flexibility.

INDUSTRIAL APPLICABILITY

The disclosed fluid-handling system may be implemented into any power system application where charged air induction and exhaust gas recirculation are utilized. The disclosed fluid-handling system may utilize charged air to cool exhaust gas before it is recirculated back into the engine for subsequent combustion, thereby improving an effectiveness of the recirculation in reducing NOx production. In addition, the disclosed fluid handling system may convert waste heat energy absorbed by the charged air during the exhaust cooling process to useful energy. The operation of fluid handling system 14 will now be described.

During operation of power source 12, combustion air may be drawn into compressor 29 of combustion turbocharger 24 via passage 32 and be pressurized. This pressurized air may be directed from compressor 29 through compressor passage 36 and into air cooler 28 via air inlet 58. After cooling within air cooler 28, the pressurized air may then flow into power source 12 via air duct 62. Fuel may be mixed with this cooled and pressurized airflow before or after entering power source 12, and subsequently combusted to generate a mechanical power output and a flow of exhaust.

The exhaust flow exiting power source 12 may be divided into two portions, including a main portion that passes through exhaust duct 38 and into turbine 27 of combustion turbocharger 24, and a remaining portion. The main portion of the exhaust flow may expand within turbine 27 and drive turbine 27 to rotate connected compressor 29, thereby pressurizing additional combustion air. This exhaust may then flow through exhaust passage 30 to turbine 27 of EGR turbocharger 22, where the exhaust expands further and drives turbine 27 to rotate connected compressor 29 and pressurize air used for cooling within EGR cooler 26. After exiting EGR turbocharger 22, the main portion of the exhaust flow from power source 12 may be discharged to the atmosphere.

The remaining portion of exhaust from power source 12 may be directed through EGR valve 57 and EGR passage 54 into EGR cooler 26 via exhaust inlet 46. The exhaust passing through EGR cooler 26 may transfer heat to the cooling air from EGR turbocharger 22, and exit EGR cooler 26 at a lower temperature via exhaust outlet 48. At this time, movement of EGR valve 57 may affect a flow rate of exhaust through EGR passage 54 and thereby an amount of heat transfer occurring within EGR cooler 26. Additionally or alternatively, the heat transfer within EGR cooler 26 may be adjusted via bypass valve 100 and/or by changing the vane geometry of EGR turbocharger 22. After leaving EGR cooler 26, the cooled exhaust may flow through EGR passage 56 to join and mix with air inside compressor passage 36. This addition of exhaust to the air entering power source 12 may reduce a concentration of oxygen and increase a thermal mass within combustion chambers 20, thereby lowering a resulting combustion temperature. The lowered combustion temperature may slow a chemical reaction of the combustion process and thereby decrease the formation of NOx.

After absorbing heat from the recirculated exhaust flow, the air passing through EGR cooler 26 may exit at an elevated temperature via air outlet 44 and flow to turbo-generator 50. As the heated charge air enters turbine 64, the air may expand and drive turbine 64 to rotate generator 66 and produce power (electrical, hydraulic, kinetic, etc.) used to increase a capacity and/or an efficiency of power source 12. After exiting turbogenerator 50, the flow of air may be directed via passage 68 to join the exhaust being discharged to the atmosphere from exhaust passage 40.

The architecture of fluid handling system 14 may have many positive attributes. For example, because compressors 29 may receive inlet air in parallel, operation of the different compressors 29 may be substantially isolated from each other. That is, changes in pressures, flows, and/or temperatures of one compressor 29 may have little effect on the pressures, flows, and/or temperatures of the other compressor 29. Accordingly, compressors 29 may be controlled as needed to separately improve engine and EGR operations without substantial interactions. Further the parallel nature of compressors 29 may allow for each compressor 29 to be designed specifically for the dedicated applications of EGR or combustion air charging, without compromising compressor performance for a dual-purpose application. In addition, by directing the spent air from turbine 64 to join the main portion of the exhaust flow at a location downstream of EGR turbocharger 22, complexities involved with turbine balancing may be reduced. That is, turbine 27 of EGR turbocharger 22 may be substantially unaffected by varying pressures, flows, and/or temperatures of the spent air. Finally, the use of bypass valve 100 may allow for air and exhaust temperature control of EGR cooler 26 without risking surging of EGR turbocharger 22. Specifically, by selectively allowing charge air to bypass EGR cooler 26, as opposed to restricting or stopping the flow of air, the likelihood of compressor 29 surging may be reduced.

It will be apparent to those skilled in the art that various modifications and variations can be made to the disclosed fluid-handling system. Other embodiments will be apparent to those skilled in the art from consideration of the specification and practice of the disclosed fluid-handling system. It is intended that the specification and examples be considered as exemplary only, with a true scope being indicated by the following claims and their equivalents.

What is claimed is:

1. A fluid-handling system for an engine, comprising:
a first turbine connected to receive a first portion of an exhaust flow from the engine;
a first compressor driven by the first turbine to pressurize a first airflow;
a heat exchanger configured to receive a second portion of the exhaust flow from the engine and the first airflow;
a second turbine connected to receive the first airflow from the heat exchanger;
a generator driven by the second turbine to generate power; and
wherein the second portion of the exhaust flow is directed into the engine for combustion.

2. The fluid-handling system of claim 1, further including a second compressor configured to pressurize a second airflow directed into the engine for combustion, wherein the first and second compressors receive inlet air in parallel.

3. The fluid-handling system of claim 2, further including a second heat exchanger configured to cool the second airflow.

4. The fluid-handling system of claim 3, wherein the second portion of the exhaust flow from the heat exchanger is directed to join the second airflow at a location upstream of the second heat exchanger.

5. The fluid-handling system of claim 2, further including a third turbine connected to receive the first portion of exhaust flow from the engine, wherein the second compressor is driven by the third turbine.

6. The fluid-handling system of claim 5, wherein the first and third turbines are disposed in series.

7. The fluid-handling system of claim 2, wherein the second compressor is driven by the first turbine.

8. The fluid-handling system of claim 1, wherein an outlet of the second turbine is fluidly connected with an outlet of the first turbine.

9. The fluid-handling system of claim 1, wherein the generator is configured to generate electrical power.

10. The fluid-handling system of claim 1, further including a bypass valve configured to selectively cause the first airflow to bypass the heat exchanger.

11. A method of handling exhaust from an engine, comprising:
combusting a mixture of air and fuel to generate a mechanical output and an exhaust flow;
mechanically removing energy, via a first turbine, from a first portion of the exhaust flow;
using the energy to pressurize an airflow;
transferring heat from a second portion of the exhaust flow to the airflow;
mechanically removing energy, via a second turbine, from the airflow after transferring the heat;
converting the energy mechanically removed from the airflow to one of electrical energy, hydraulic energy, and kinetic energy; and
directing the second portion of the exhaust flow after the energy has been removed to join combustion air.

12. The method of claim 11, further including:
mechanically removing additional energy from the first portion of the exhaust flow; and
using the additional energy to pressurize combustion air.

13. The method of claim 12, wherein the airflow and the combustion air are pressurized in parallel.

14. The method of claim 12, further including cooling the combustion air.

15. The method of claim 14, further including directing the second portion of the exhaust flow after the energy has been removed to join the combustion air before cooling of the combustion air.

16. The method of claim 12, wherein the energy and the additional energy are mechanically removed from the first portion of the exhaust flow in series.

17. The method of claim 11, further including selectively inhibiting the airflow from transferring heat with the second portion of the exhaust flow.

18. A power system, comprising:
an engine having an air duct and an exhaust duct;
a first turbine fluidly connected to the exhaust duct to receive a first portion of an exhaust flow from the engine;
a first compressor fluidly connected to the air duct and driven by the first turbine to pressurize a first airflow directed into the engine;
a first heat exchanger configured to cool the first airflow before it is received by the engine;
a second compressor driven by one of the first turbine, or a third turbine fluidly connected to the exhaust duct to receive the first portion of the exhaust flow, the second compressor configured to pressurize a second airflow;
a second heat exchanger configured to receive a second portion of the exhaust flow from the engine and the second airflow from the second compressor;
a second turbine connected to receive the second airflow from the second heat exchanger;
a generator driven by the second turbine to generate electricity; and
wherein the second portion of the exhaust flow is directed to the air duct of the engine.

19. The power system of claim 18, wherein the first and second compressors receive inlet air in parallel and the third turbine is fluidly connected to the first turbine to receive the first portion of the exhaust flow from the first turbine in series.

* * * * *